(12) United States Patent
Ahn et al.

(10) Patent No.: US 11,850,919 B2
(45) Date of Patent: Dec. 26, 2023

(54) AIR VENT APPARATUS OF VEHICLE

(71) Applicant: HYUNDAI MOBIS CO., LTD., Seoul (KR)

(72) Inventors: Sung Joon Ahn, Seongnam-si (KR); Seung Hwan Lee, Hwaseong-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 25 days.

(21) Appl. No.: 17/514,915

(22) Filed: Oct. 29, 2021

(65) Prior Publication Data
US 2022/0134849 A1    May 5, 2022

(30) Foreign Application Priority Data
Oct. 30, 2020    (KR) .......................... 10-2020-0143398

(51) Int. Cl.
*B60H 1/34*    (2006.01)
*B60H 1/00*    (2006.01)

(52) U.S. Cl.
CPC ......... *B60H 1/3421* (2013.01); *B60H 1/0065* (2013.01); *B60H 1/00985* (2013.01); *B60H 2001/3471* (2013.01)

(58) Field of Classification Search
CPC .............. B60H 1/0065; B60H 1/00871; B60H 1/00985; B60H 1/3414; B60H 1/3421; B60H 1/345; B60H 2001/3471; B60K 2370/128
See application file for complete search history.

(56) References Cited

U.S. PATENT DOCUMENTS

2020/0207186 A1 *    7/2020    Nemoto ................. B60H 1/345

FOREIGN PATENT DOCUMENTS

| DE | 10121909 A1 * | 11/2002 | ......... B60H 1/00871 |
| DE | 102011114051 A1 * | 3/2013 | ........... B60H 1/0065 |
| EP | 1243450 A2 * | 9/2002 | ........... B60H 1/3414 |
| FR | 3028810 A1 * | 5/2016 | ........... B60H 1/0065 |

* cited by examiner

*Primary Examiner* — Edelmira Bosques
*Assistant Examiner* — Michael James Giordano
(74) *Attorney, Agent, or Firm* — NovoTechIP International PLLC

(57) ABSTRACT

An air vent apparatus of a vehicle according to one embodiment of the present invention includes a knob electrically interlocked with a display disposed inside a cockpit and laterally moved to selectively operate various functions installed in the display and an air duct disposed on a movement path of the knob and configured to adjust a ventilation direction of air introduced into an interior of a vehicle according to the lateral movement of the knob.

18 Claims, 5 Drawing Sheets

KNOB MOVEMENT TO THE RIGHT - RIGHT WIND DIRECTION COMPENSATION

AIR VENT APPARATUS OF VEHICLE

CROSS-REFERENCE TO RELATED APPLICATIONS

This application claims priority to and the benefit of Korean Patent Application No. 10-2020-0143398, filed on Oct. 30, 2020, the disclosure of which is incorporated herein by reference in its entirety.

BACKGROUND OF THE INVENTION

1. Field of the Invention

The present invention relates to an air vent apparatus of a vehicle.

2. Discussion of Related Art

According to the development of autonomous driving technology, a concept of a future cockpit and a vehicle interior brings a change in interior space, and a large screen display and the like are applied to the front of the cockpit, and thus there is a structural problem of insufficient space for placing electrical devices.

Accordingly, since a region, in which an air vent is provided, is reduced or covered, there is a need for structural improvement therein.

BRIEF SUMMARY OF THE INVENTION

The present invention is directed to providing an air vent apparatus of a vehicle in which an air duct is disposed under a large screen display in a cockpit and a wind direction of the air duct is adjusted according to lateral movement of a knob through which the display is manipulated.

Objectives to be solved through the present invention are not limited to the objective described above, and other objectives, which are not described above, will be clearly understood through the following descriptions by those skilled in the art.

According to one aspect of the present invention, there is provided an air vent apparatus of a vehicle including a knob electrically interlocked with a display disposed inside a cockpit and laterally moved to selectively operate various functions installed in the display and an air duct disposed on a movement path of the knob and configured to adjust a wind direction of air introduced into an interior of a vehicle according to the lateral movement of the knob.

The air duct may include an inlet connected to an outlet of an air conditioning device disposed inside the vehicle and an outlet facing an interior of the vehicle, and the outlet of the air duct may have a cross section which is relatively greater than a cross section of the inlet.

The air duct may include a plurality of wings disposed at predetermined intervals in a width direction, and the wings may be laterally adjusted in conjunction with the knob.

The air duct may be divided into a left wind section and a right wind section at left and right sides with respect to a center in the width direction, and the wing disposed in the left wind section and the wing disposed in the right wind section may be rotated at different angles by the knob.

In the air duct, when the knob is positioned at any one section of the left and right wind sections, only the wing disposed in the corresponding section at which the knob is positioned may be rotated in the same direction as a direction in which the knob rotates.

The air duct may include a mesh cover including a plurality of mesh holes in an outlet facing the interior of the vehicle.

The knob may be set to selectively stop an interlocking mode with the display when a wind direction of the air duct is adjusted.

According to another aspect of the present invention, there is provided an air vent apparatus of a vehicle including a knob electrically interlocked with a display disposed between a driver seat and a passenger seat and laterally moved in a longitudinal direction of the display to selectively operate various functions installed in the display, and an air duct of which an inlet connected to an outlet of an air conditioning device disposed inside a vehicle is formed at one side in a longitudinal direction and an outlet is formed at the other side facing an interior of the vehicle in the longitudinal direction.

In this case, the outlet of the air duct may have a cross section which is relatively greater than a cross section of the inlet of the air duct, and the air duct may have an inclined structure of which a cross section increases in a direction from the inlet of the air duct toward the outlet of the air duct.

The knob may be connected to a guide rail disposed at one side of the display to be moved laterally and may be moved laterally in a width direction of the outlet of the air duct.

The guide rail may include a plurality of position sensors disposed at predetermined intervals in the longitudinal direction at regions of the functions, and the position sensor may detect a position of the knob and transmit the position to an electronic control unit (ECU) of the vehicle.

A wire may be provided between and electrically connect the knob and the display.

The wire may be formed to be bent around the guide rail in order to prevent mutual interference when the knob moves on the guide rail.

A wire may be provided between and electrically connect the knob and the display, and a slit, through which the wire passes, may be formed in an upper end of the air duct.

The knob may be wirelessly connected to the display through an ultra-wide band (UWB) method.

The display may display a wind direction, which is a direction toward the interior of the vehicle, of the air duct as image information.

According to still another aspect of the present invention, there is provided an air vent apparatus of a vehicle including a knob disposed between a driver seat and a passenger seat and configured to selectively operate various functions of a display having cluster information and an air duct in which a guide rail providing a lateral movement path of the knob is disposed in a width direction.

In this case, the air duct may include a plurality of wings laterally inclined in the width direction with respect to a center.

The wing of the air duct may be disposed at a position not to be interfered with by movement of the knob.

DETAILED DESCRIPTION OF THE INVENTION

Advantages and features of the present invention and methods of achieving the same will be clearly understood with reference to the following exemplary embodiments described in detail with the accompanying drawings. However, the present invention is not limited to the embodiments to be disclosed below and may be implemented in various different forms. The embodiments are provided only in order to fully describe the present invention and fully notify the scope of the present invention to those skilled in the art, and the scope of the present invention is defined by the appended claims. Meanwhile, the terms used herein are provided only to describe the embodiments of the present invention and are not for purposes of limitation. Unless the context clearly indicates otherwise, the singular forms described in the specification include the plural forms. In addition, the terms "comprise," or "comprising," used herein are used as a meaning of specifying some stated components, steps, operations and/or elements, but do not preclude the presence or addition of one or more other components, steps, operations and/or elements.

Hereinafter, exemplary embodiments of the present invention will be described in detail with reference to the accompanying drawings.

Figure 1:
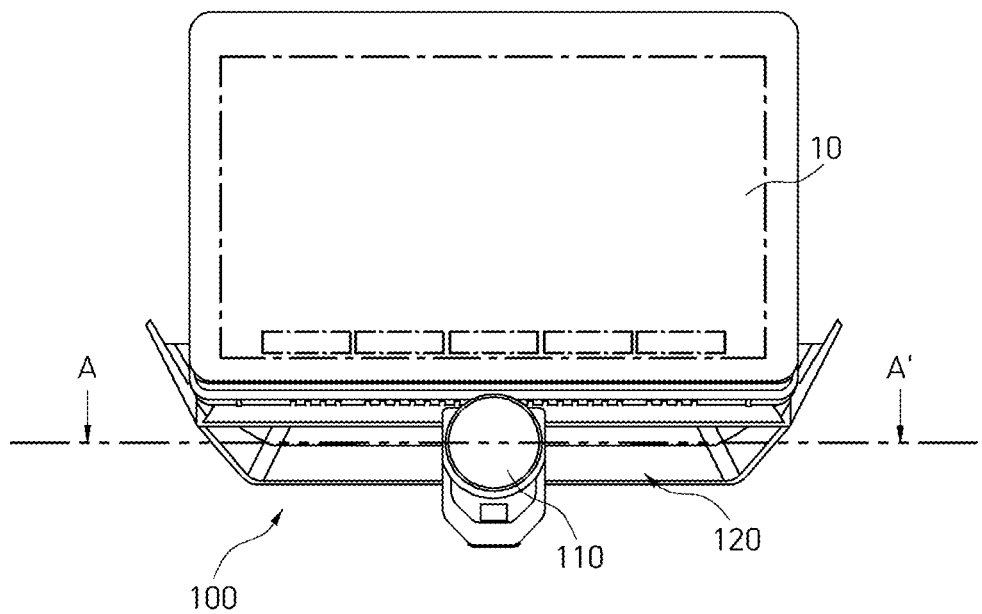
FIG. 1 is a schematic view illustrating an air vent apparatus of a vehicle according to one embodiment of the present invention.
Figure 2:
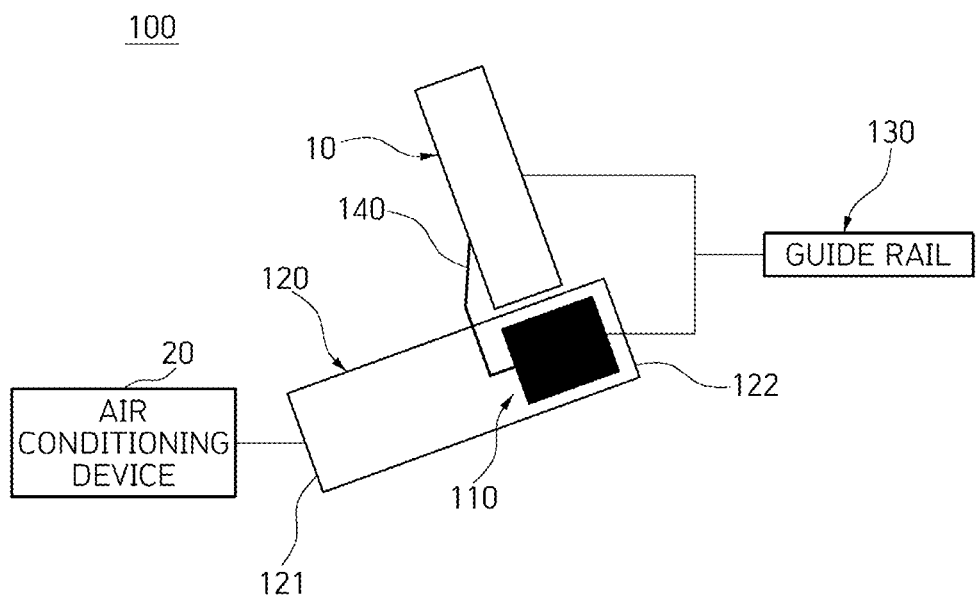
FIG. 2 is a schematic side view illustrating the air vent apparatus of the vehicle according to one embodiment of the present invention.

FIG. 1 is a schematic view illustrating an air vent apparatus of a vehicle according to one embodiment of the present invention, and FIG. 2 is a schematic side view illustrating the air vent apparatus of the vehicle according to one embodiment of the present invention.

Referring to FIGS. 1 and 2, an air vent apparatus 100 of a vehicle is disposed under a display 10 by considering a design in a slimmed cockpit. The air vent apparatus 100 of the vehicle includes a knob 110 and an air duct 120.

The knob 110 may be operatively coupled to the display 10 and selectively operate various functions of the display 10 through lateral movement. The knob 110 has a structural mechanism that is movable along a movement path in a sliding manner below the display 10. The movement path of the knob 110 may include a plurality of locations corresponding respectively to a plurality of vehicle operation functions displayed on the display 10.

A desired mode may be performed by rotating or pressing the knob 110 in a state in which the knob 110 is moved. In this case, a screen layout or widget settings for each function of the display 10 may also be conveniently performed by a user in a setting mode.

In this case, a guide rail 130 provides the movement path of the knob 110. The guide rail 130 divides a plurality of functional regions interlocked with widgets of corresponding functions displayed on the display 10.

The guide rail 130 includes a plurality of position sensors (not shown) disposed at predetermined intervals in a longitudinal direction.

In this case, when the knob 110 moves laterally in the longitudinal direction of the guide rail 130, the position sensor detects a position of the knob 110 and transmits sensing data thereof to an electronic control unit (ECU, not shown in the corresponding drawing). The ECU may calculate a result value of comparison between the sensing data of the knob 110 received from the position sensor and reference data and control the display 10 to display the widget of the function corresponding to the result value.

A wire 140 is provided between and electrically connects the knob 110 and the display 10.

The wire 140 may be formed to be bent around the guide rail 130 in order to be prevented from interfering with the knob 110 when the knob 110 moves on the guide rail 130.

In this case, a slit (not shown) through which the wire 140 passes may be formed in an upper end of the air duct 120.

In this case, the display 10 changes an image and displays a changed image for vehicle traveling information whenever the knob 110 is positioned at a functional region.

The display 10 is a large screen apparatus installed in the cockpit and is basically disposed between a driver seat and a passenger seat.

Since the display 10 having a large screen is positioned at a center fascia, it is difficult to place peripheral electric devices in a space, and thus, instead of conventional physical buttons having functions for the vehicle traveling information, corresponding functions are displayed on the display 10 as widget images. Accordingly, the display 10 may improve intuition and operability by reducing depth and operation steps of a menu for a corresponding function displayed as a widget.

The display 10 may display a state of an air ventilation direction, which is a direction toward an interior of the vehicle, of the air duct 120 as image information.

The air duct 120 includes an inlet 121 connected to an outlet of an air conditioning device 20 in the vehicle and an outlet 122 facing the interior of the vehicle.

In this case, the outlet 122 of the air duct 120 has a cross section area which is relatively greater than that of the inlet 121.

Figure 3:
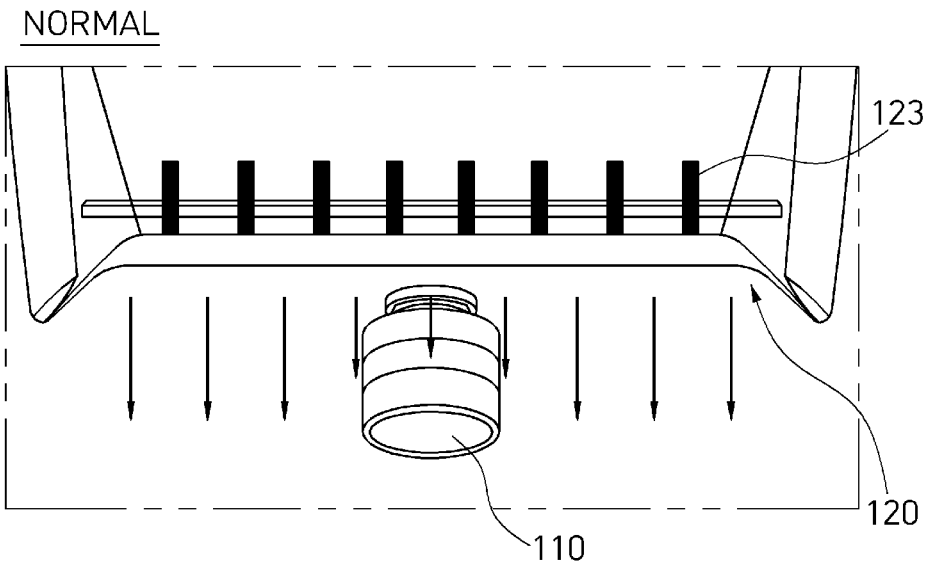
FIGS. 3 to 5 are operational views illustrating a cross section taken along line A-A' of FIG. 1.
Figure 4:
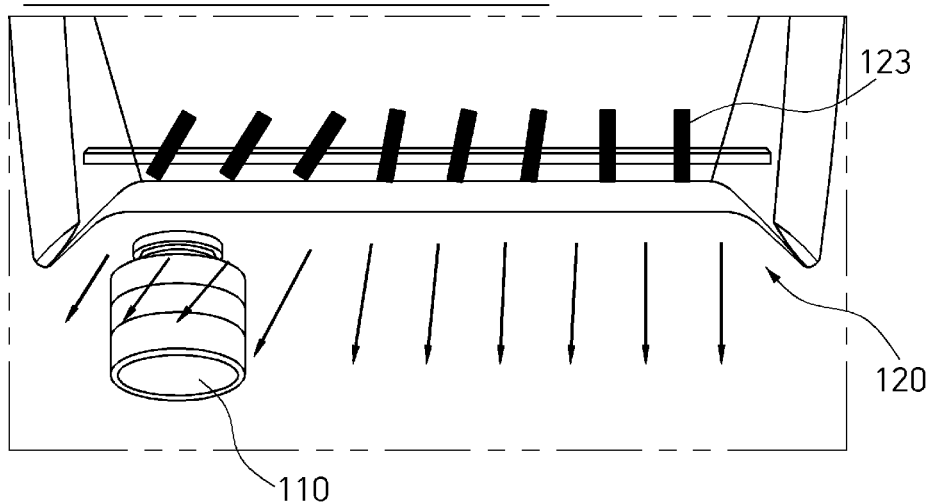
Figure 5:
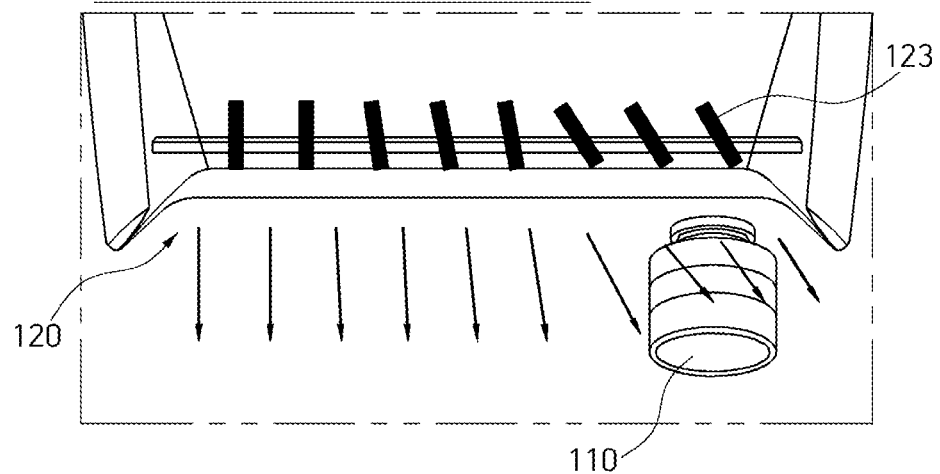

FIGS. 3 to 5 are operational views illustrating a cross section taken along line A-A' of FIG. 1.

Referring to FIGS. 3 to 5, the air duct 120 may include a plurality of wings 123. The plurality of wings 123 are disposed at predetermined intervals in a width direction of the air duct 120. In this case, the wings 123 may be laterally adjusted in conjunction with the knob 110.

When the user manipulates the knob 110, the plurality of wings 123 are moved with the knob 110 and guide air to be discharged in any direction in the vehicle according to a position of the knob 110.

Since the knob 110 laterally moves in the width direction of the air duct 120, a shape of the knob 110 may serve to hinder the outlet by covering the outlet. Accordingly, the wings 123 need to be adjusted by as much as a covered portion of the outlet in a direction in which the knob 110 is positioned, and a wind amount needs to be compensated for by adjusting the plurality of wings 123.

To this end, the air duct 120 is divided into left and right wind sections at the left and right sides with respect to a center of the air duct 120 in the width direction.

The wings 123 disposed in the left wind section and the right wind section may be rotated at different angles by the knob 110.

As another example, when the knob 110 is positioned at any one of the left and right wind sections, in the air duct 120, only the wings 123 disposed at a section corresponding to a position at which the knob 110 is positioned may be rotated in a direction in which the knob 110 is rotated.

The knob 110 may be set to selectively stop an interlocking mode with the display 10 when an air ventilation direction of the air duct 120 is adjusted.

Figure 6:
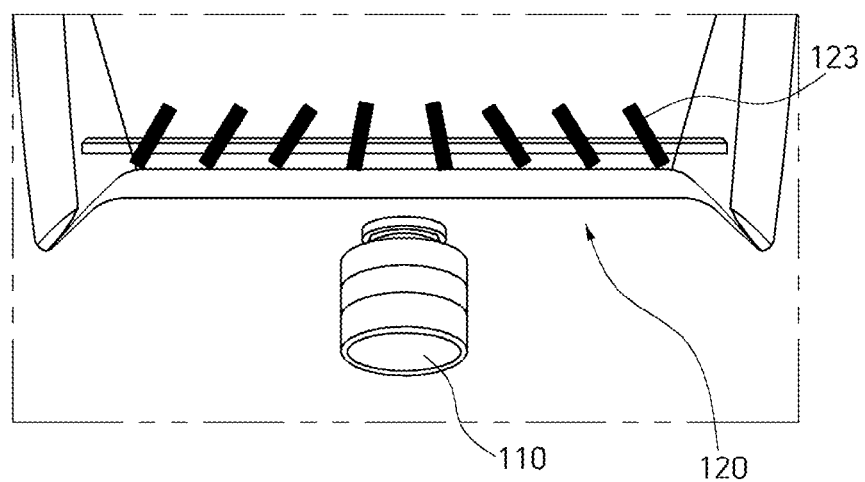
FIG. 6 is a plan view illustrating a modified example of the cross section taken along line A-A' of FIG. 1.

FIG. 6 is a plan view illustrating a modified example of the cross section taken along line A-A' of FIG. 1.

Referring to FIG. 6, in an air duct 120, a plurality of wings 123 have a diffusion-type open structure to be inclined leftward or rightward with respect to a center of the air duct 120 in a width direction.

In this case, the wings 123 are disposed at a position so as not to be interfered with by movement of a knob 110 regardless of the movement of the knob 110. That is, the plurality of wings 123 have a structural characteristic of smoothly diffusing air introduced into an interior of a vehicle regardless of the movement of the knob 110 instead of being interlocked with the knob 110.

Figure 7:
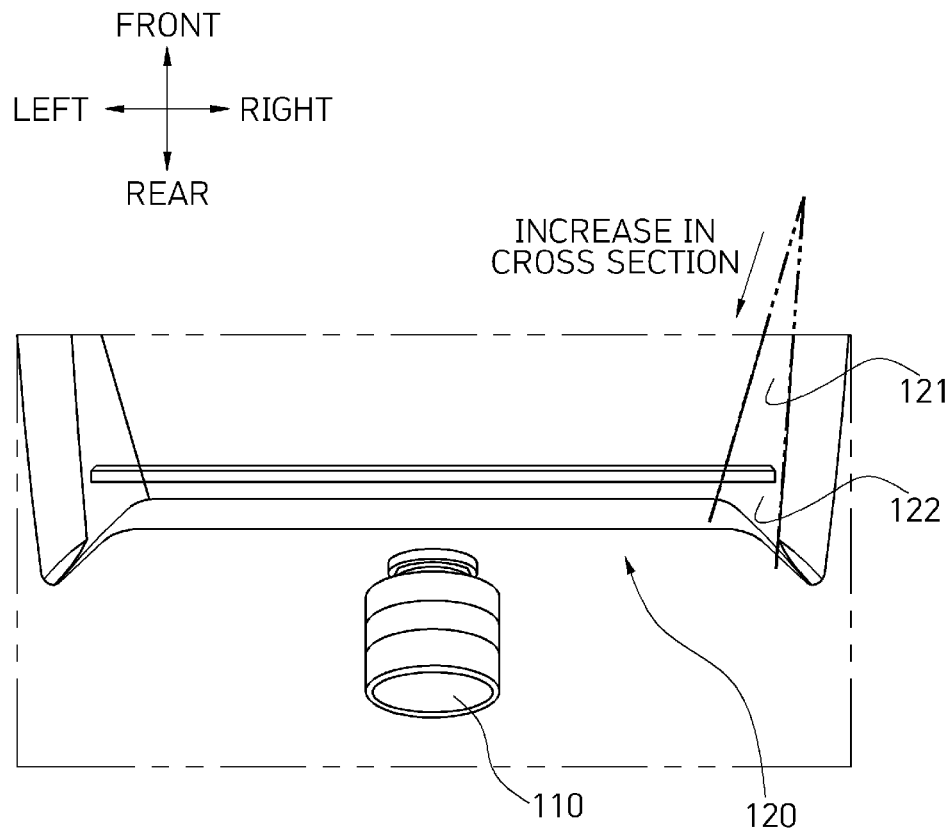
FIG. 7 is a plan view illustrating another modified example of the cross section taken along line A-A' of FIG. 1.

FIG. 7 is a plan view illustrating another modified example of the cross section taken along line A-A' of FIG. 1.

In FIG. 7, forward, rearward, left, and right directions are shown based on a driver seat in a vehicle for the sake of convenience in the description. A front-rear direction means a longitudinal direction, and a left-right direction means a width direction.

Basically, it is important to secure an air ventilation direction for air conditioning performance. Since a wind amount is determined by an air duct 120 and a cross section of an outlet 122 in a cockpit, it is needed to secure the cross section.

To this end, the air duct 120 of FIG. 7 has an open structure to which a wing is not applied, and an inlet 121 connected to an outlet (not shown in the corresponding drawing) of an air conditioning device in the vehicle is formed at one side in the longitudinal direction. The outlet 122 is formed at the other side facing an interior of the vehicle in the longitudinal direction.

In this case, the outlet 122 of the air duct 120 has a cross section area which is relatively greater than that of the inlet 121. Accordingly, the air duct 120 has an inclined structure having a cross section area increasing in a direction from the inlet 121 toward the outlet 122.

Even when a knob 110 moves leftward or rightward on the outlet 122 of the air duct 120 in the width direction, a discharge cross section of the outlet 122 may be maintained regardless of a position of the knob 110.

Figure 8:
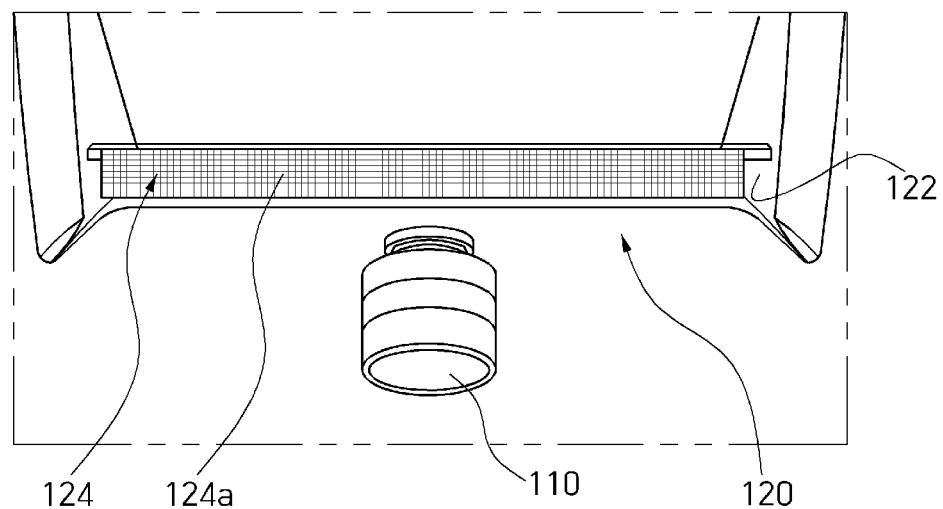
FIG. 8 is a plan view illustrating still another modified example of the cross section taken along line A-A' of FIG. 1.

FIG. 8 is a plan view illustrating still another modified example of the cross section taken along line A-A' of FIG. 1.

An air duct 120 in FIG. 8 may include a mesh cover 124 having a plurality of mesh holes 124*a* in an outlet 122 facing an interior of a vehicle.

In this case, the mesh cover 124 may have an additional empty space above and/or under the mesh cover 124 so as not to be interfered with when a knob 110 moves leftward or rightward.

The mesh cover 124 has a structural characteristic of uniformly diffusing and introducing air, which is introduced into the interior of the vehicle, regardless of leftward or rightward movement of the knob 110.

Figure 9:
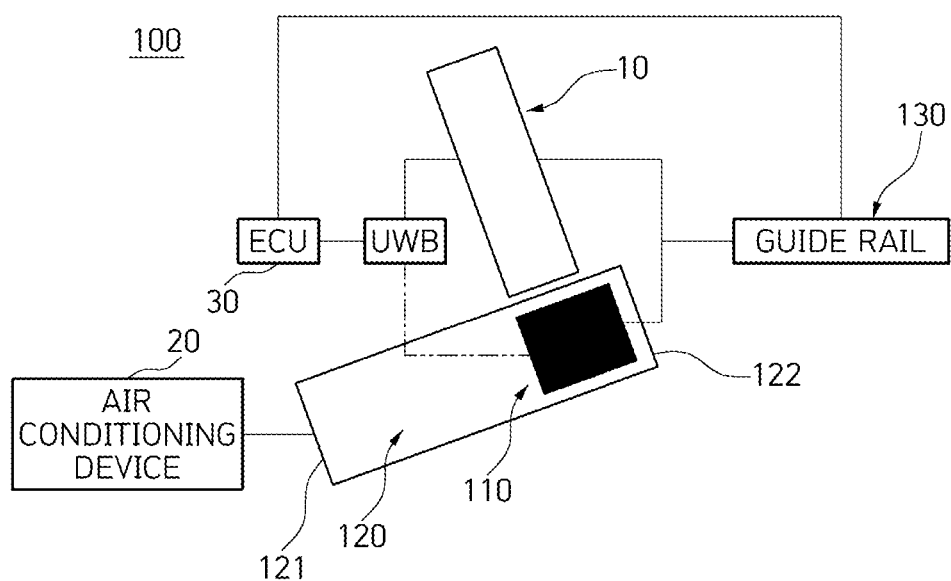
FIG. 9 is a schematic side view illustrating an air vent apparatus of a vehicle according to another embodiment of the present invention.

FIG. 9 is a schematic side view illustrating an air vent apparatus of a vehicle according to another embodiment of the present invention.

Referring to FIG. 9, a knob 110 may be wirelessly connected to a display 10 through an ultra-wide band (UWB) connection.

The UWB is a technology which calculates a distance between communication subjects by multiplying a signal arrival time between the communication subjects by the speed of light using Time of Flight (ToF) technology.

Unlike Wi-Fi and Bluetooth, the UWB uses a wide frequency band, and a large amount of information may be transmitted due to a high transmission rate with low power.

Positioning using the UWB technology has advantages of a low error rate of around 20 centimeters, high transmittance to an obstacle, and not being affected by other signals such as Wi-Fi.

Accordingly, in a state in which the display 10 and the knob 110 are connected wirelessly through the UWB connection, the display 10 and the knob 110 may be integrally controlled by an ECU 30.

For example, when a position of the knob 110 is moved along a guide rail 130, one of widgets for function interlocked with the position of the knob 110 is displayed on the display 10 interlocked with the knob 110.

When a user sets the displayed widget, a corresponding function may be performed according to a command of the ECU 30.

The display 10 may display a state of an air ventilation direction, which is a direction toward an interior of the vehicle, of the air duct 120 as image information.

Basically, the display 10 and a liquid crystal display (LCD, not shown, and a touch portion) of the knob 110 are formed as capacitive types, and thus touch sensitivity is improved.

When the user brings a conductor (including the human body and a current conducting object) at a preset proximity distance in order to grip the knob 110, the LCD or display 10 recognizes the conductor and operates a system in conjunction therewith.

In this case, an infrared (IR) sensor (not shown) or ToF sensor (not shown) is provided under the knob 110 to recognize an action of the user.

However, the IR sensor or ToF sensor is not limited to being installed under the knob 110 and may be installed at any position as long as it is not being interfered with by a front viewing angle.

Meanwhile, as a conductor is applied to a grip portion of an edge of the knob 110 and is connected to an inner capacitive touch sensor, the grip portion may recognize a touch. In this case, a flexible printed circuit board (FPCB) type touch film may be applied to an inner circumference of the edge of the knob 110.

According to the present invention, an air vent apparatus of a vehicle provides a movement path of a sliding knob interlocked with a display even in a structure in which the large screen display is applied to the front of the cockpit. Accordingly, a degree of space freedom can be secured, and intuitive manipulation convenience can be implemented.

Particularly, in the present invention, since wings and the knob, which are provided between an air duct provided under the display, are interlocked, and the knob moves laterally in the air duct, a structural effect of adjusting an air ventilation direction of the air duct is provided.

The present invention is not limited to the embodiments described above and may be variously modified within a range allowed by the technical sprit of the present invention.

What is claimed is:

1. An air vent apparatus for a vehicle, comprising:
   a knob operatively coupled to an interior display of a vehicle and configured to be laterally movable along a movement path such that a driver of the vehicle can place the knob at any of a plurality of locations on the movement path, each of the plurality of locations corresponding respectively to a plurality of vehicle operation functions, wherein a different respective vehicle operation function is displayed on the display based on a lateral position of the knob in a corresponding one of the plurality of locations; and an air duct positioned adjacent to the movement path of the knob and configured to adjust a ventilation direction of air introduced into an interior of the vehicle in response to a lateral movement of the knob along the movement path.

2. The air vent apparatus of claim 1, wherein the air duct includes an inlet connected to an air conditioning device of the vehicle and an outlet facing the interior of the vehicle, the outlet having a first cross section area greater than that of the inlet.

3. The air vent apparatus of claim 1, wherein the air duct includes a plurality of wings arranged laterally with a predetermined interval therebetween, the plurality of wings configured to laterally rotate in response to a movement of the knob.

4. The air vent apparatus of claim 3, wherein:
the air duct has left and right wind sections; and
the wing positioned at the left wind section and the wing positioned at the right wind section are configured to rotate at different angles, respectively.

5. The air vent apparatus of claim 4, wherein, when the knob is positioned at one of the left and right wind sections, only the wing positioned at the one of left and right wind sections rotates in a direction in which the knob rotates.

6. The air vent apparatus of claim 1, wherein the air duct includes a mesh covering an outlet of the air duct facing the interior of the vehicle.

7. The air vent apparatus of claim 1, wherein the knob is configured to stop an interlocking mode with the display when the ventilation direction of the air duct is adjusted.

8. The air vent apparatus of claim 1, further comprising:
the knob and display located between a driver seat and a passenger seat of the vehicle, the movement path extending in a longitudinal direction of the display such that a driver or passenger of the vehicle can select any of the plurality of vehicle operation functions displayed on the display; and
the air duct having an inlet connected to an air conditioning device and an outlet facing the interior of the vehicle, the outlet having a cross section area greater than that of the inlet of the air duct, wherein the air duct has an inclined structure.

9. The air vent apparatus of claim 8, wherein the knob is connected to a guide rail located adjacent to the display and configured to guide the knob to move along the movement path extending in a width direction of the outlet of the air duct.

10. The air vent apparatus of claim 9, wherein the guide rail includes a position sensor configured to detect a location on the movement path at which the knob is positioned.

11. The air vent apparatus of claim 8, further comprising a wire extending between the knob and the display and bent around the guide rail to avoid impeding a movement of the knob along the movement path.

12. The air vent apparatus of claim 8, further comprising a wire extending between the knob and the display,
wherein the air duct has a slit, and the wire passes through the slit.

13. The air vent apparatus of claim 8, wherein the knob is wirelessly connected to the display via an ultra-wide band (UWB) connection.

14. The air vent apparatus of claim 8, wherein the display is configured to display an image showing a ventilation direction of an air ventilated to the interior of the vehicle via the outlet of the air duct.

15. The air vent apparatus of claim 1, wherein the display displays a different corresponding screen layout or widget settings for each of the plurality of vehicle operation functions depending on the lateral position of the knob.

16. The air vent apparatus of claim 1, wherein rotation or pressing of the knob adjusts a mode of vehicle operation in one of the vehicle operation functions.

17. The air vent apparatus of claim 1, wherein the plurality of locations corresponds to a plurality of functional regions respectively associated with widgets of corresponding functions displayed on the display.

18. The air vent apparatus of claim 1, wherein, when the knob is positioned at any one of a left and right wind sections, in the air duct, only wings disposed at a section corresponding to a position of the knob are rotated in a direction in which the knob is rotated.

* * * * *